United States Patent [19]
Lovingood
[11] 3,902,020
[45] Aug. 26, 1975

[54] PARTY CONTROL CONVERSION SYSTEM FOR TELEPHONE EXCHANGES

[75] Inventor: Walter B. Lovingood, El Paso, Tex.
[73] Assignee: Glenn E. Woodward, El Paso, Tex. ; a part interest

[22] Filed: Feb. 11, 1974
[21] Appl. No.: 441,314

[52] U.S. Cl. ........ 179/18 FH; 179/17 A; 179/27 DB
[51] Int. Cl.[2] ........ H04M 3/42
[58] Field of Search ......... 179/18 FH, 27 DB, 17 A, 179/5.5, 175, 175.21

[56] References Cited

UNITED STATES PATENTS 3,529,096 9/1970 Hosking et al. ................ 179/18 FH Primary Examiner—Kathleen H. Claffy
Assistant Examiner—C. T. Bartz
Attorney, Agent, or Firm—Clarence A. O'Brien; Harvey B. Jacobson

[57] ABSTRACT

Groups of connector switch assemblies at a central telephone exchange are connected to plug-in terminals adapted to receive conversion circuit cards by means of which signal transmitting switch trains may be held by called parties at receiving stations for call tracing purposes. The conversion circuits are operative independently of the test jacks to simulate the control normally exercised by the calling party over the switch train established through the connector switch assemblies.

8 Claims, 7 Drawing Figures

PARTY CONTROL CONVERSION SYSTEM FOR TELEPHONE EXCHANGES

This invention relates to the tracing of telephone calls at a central telephone exchange by temporary conversion of equipment to control by the called parties at receiving stations.

In an effort to trace nuisance or threatening telephone calls, various devices and systems have been applied or proposed for step by step dialing types of central telephone exchanges to convert switching equipment from calling party to called party control. In most cases such prior devices were plugged into the test jacks associated with the connector switch assemblies. The number of plug-in devices and wiring necessary for such conversion of equipment was found to be impracticable from time and cost standpoints in telephone systems servicing an area of any significant size. Also, use of such prior devices renders the test jacks unavailable for their intended use in monitoring and testing the equipment. In a 10,000 line, step by step central exchange office for example, using 200 point equipment, it would be necessary to plug 1,000 devices into the test jacks and would tie up a corresponding number of test jacks.

It is therefore an important object of the present invention to convert equipment at a telephone exchange office to called party control for call tracing purposes in a feasible and economical manner without tying up the test jacks associated with the connector switch assemblies through which signal switch trains are established.

In accordance with the present invention, each group of connector switch assemblies forming a shelf is permanently wired to a plug-in terminal device adapted to receive conversion circuit cards through which calling party control is simulated to hold the connection established by a completed switch train to a dialed station as long as the called party holds the line open. Each of the conversion circuits on the card consists of a pair of diodes connected in series by a resistor between tip and ring terminal connected to an associated connector switch assembly. These conversion circuits avoid detection of false conditions by trace and testing apparatus in use and do not interfere with equipment maintenance and testing.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
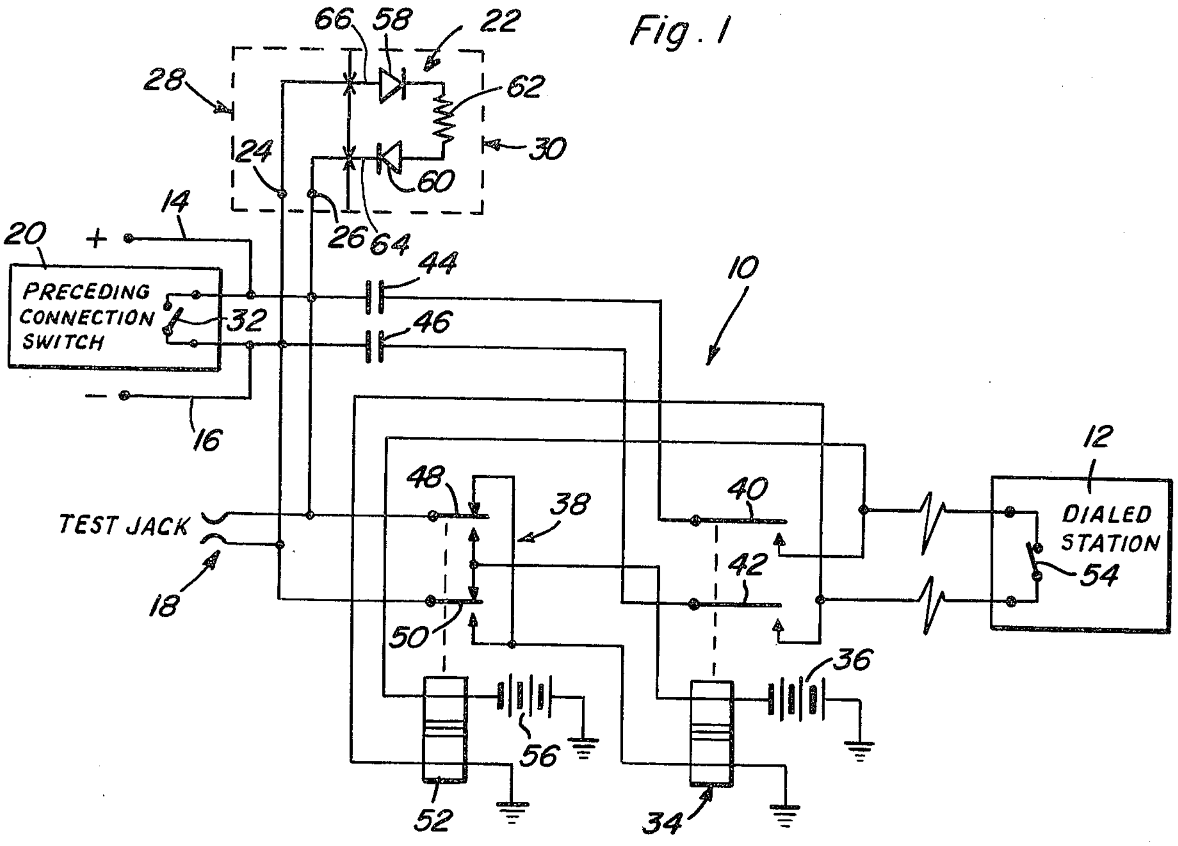
FIG. 1 is a simplified circuit diagram of a connector switch assembly portion of telephone exchange equipment with a conversion circuit connected thereto.
Figure 2:
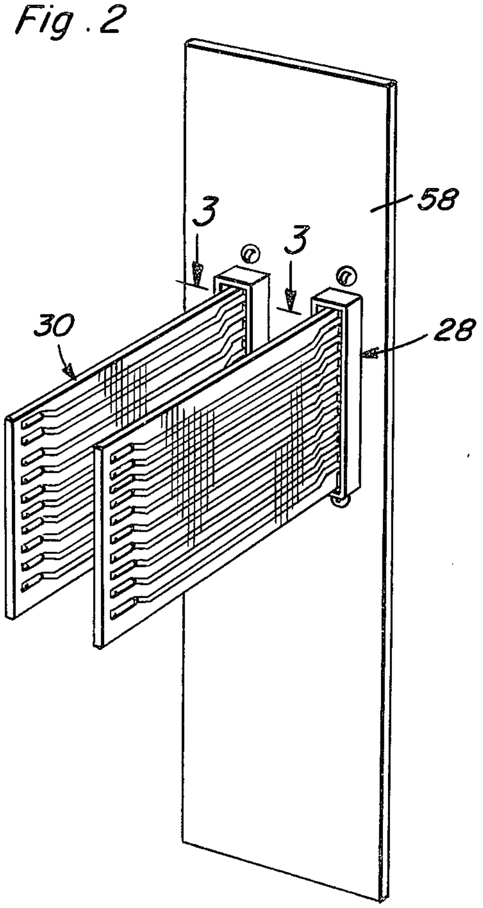
FIG. 2 is a perspective view of a pair of plug-in terminal devices on a mounting plate with conversion circuit cards plugged in for servicing a group of connector switch assemblies.
Figure 3:
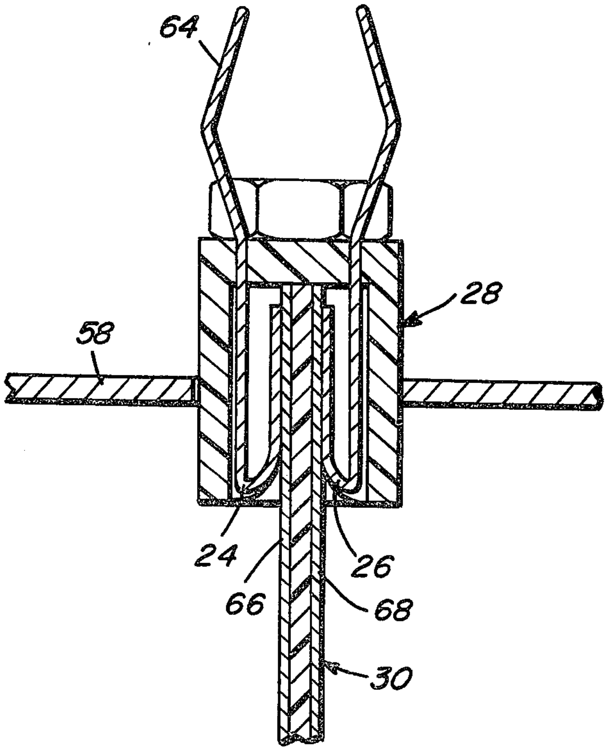
FIG. 3 is an enlarged sectional view taken subtantially through a plane indicated by section line 3—3 in FIG. 2.
Figures 4, 6:
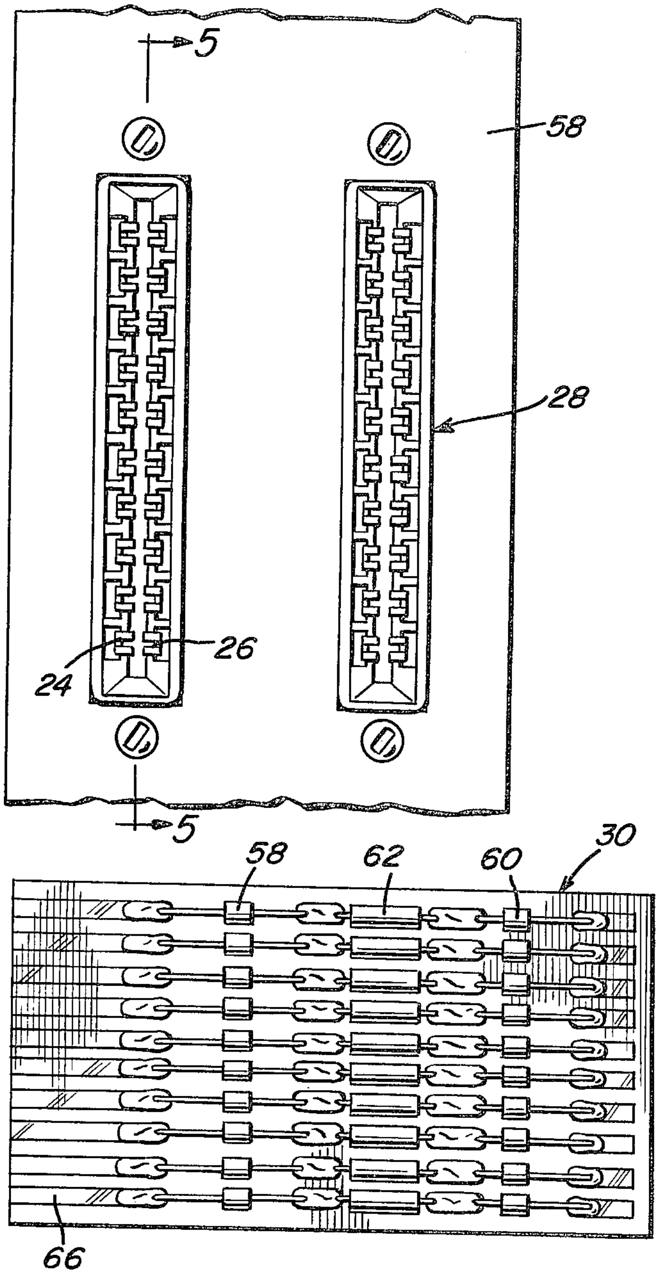
FIG. 4 is a front elevation view of the terminal devices shown in FIG. 2.
FIG. 6 is a plan view of a conversion circuit card on one side.
Figure 5:
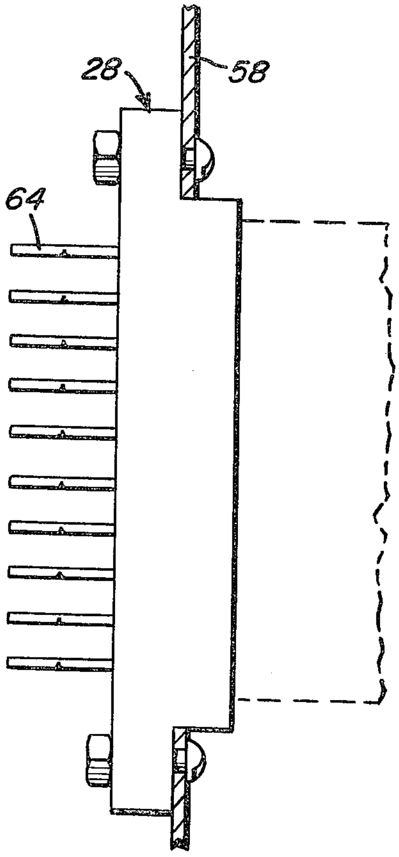
FIG. 5 is a side sectional view taken substantially through a plane indicated by section line 5—5 in FIG. 4.

Referring now to the drawings in detail, FIG. 1 illustrates a typical connector switch assembly 10 through which a signal transmitting switch train is established to a receiving or dialed station 12 remote from the central telephone exchange office. The connector switch assembly is connected to the positive line 14 and negative line 16, for example, in a step by step system at the central exchange office to which an associated test jack 18 is connected. Control over the connection switch assembly 10 is exercised by the calling party through a preceding connector switch 20 connected to the lines 14 and 16 to which the conversion circuit 22 is connected by tip and ring terminals 24 and 26.

As diagrammatically shown in FIG. 1, the terminals 24 and 26 are mounted on a terminal device 28 permanently wired to its associated connector switch assembly 10 in parallel with the test jack 18. The conversion circuit 22 on the other hand, is removably connected to the terminals 22 and 26, electrically and is mounted on a card or mounting support 30. It will become apparent, that each card 30 will mount a plurality of such conversion circuits 22, for electrical connection by a plurality of pairs of terminals 24 and 26 to a group of connector switches forming a shelf in a step by step system, for example. It should, however, be appreciated that the invention can also be applied to X-Y and other telephone exchange systems and repeater installations.

With continued reference to FIG. 1, when the connector switch assembly is seized by closure of switch 32 in a preceding connector switch 20 representing a short type condition, the operating relay coil 34 is energized by completing an energizing circuit from its battery 36 through relay switch assembly 38 connected to the preceding connector switch. The normally open relay switches 40 and 42 are thereby closed to transmit dialing pulse signals from lines 14 and 16 through the signal capacitors 44 and 46 ultimately extended to the dialed station as part of a switch train established under control of the calling party. The relay switch assembly 38 includes relay switches 48 and 50 normally establishing energization of operating relay coil 34 under polarity of battery 36, which is reversed by a signal controlled relay coil 52 operated by battery 56 to actuate the relay switches 48 and 50 and thereby place relay coil 34 under control of the calling party. Relay coil 52 is deenergized when communication is established with the dialed station 12 upon opening of a switch 54. It will be apparent therefore, that upon opening of the short condition at a preceding connector switch under control of the calling party, the switch train will ordinarily be broken in connector switch assembly 10 by deenergization of the relay coil 34 and opening of relay switches 40 and 42, because of the polarity reversal effected through relay switch assembly 38 when actuated by relay coil 52 upon receiver pick-up at the dialed station. However, in accordance with the present invention, calling party control is simulated by the conversion circuit 22 to hold the switch train connection by maintaining relay coil 34 energized and relay switches 40 and 42 closed until relay coil 52 is released by hang up at the dialed station.

The conversion circuit 22 includes a pair of diodes 58 and 60 interconnected in series conducting relation by a resistor 62. The diodes will accordingly conduct energizing current to relay coil 34 in the proper direction and under a voltage regulated by resistor 62 necessary to maintain relay coil 34 energized at the proper polarity even though the calling party hangs up.

Figure 7:
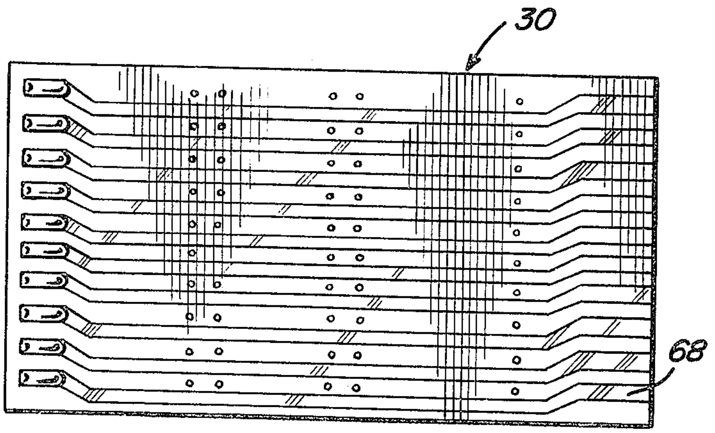
FIG. 7 is a plan view of the other side of the conversion circuit and card shown in FIG. 6.

As shown in FIGS. 2–5, a pair of terminal devices 28, each containing ten pair of tip and ring terminals 24 and 26 are installed in a mounting plate 58 for servicing a shelf of twenty connector switch assemblies to which the pairs of terminals are permanently wired through rearwardly projecting leads 64. The terminals 24 and 26 may be of the resilient contact type adapted to engage conductor leads 66 and 68 on opposite sides of the circuit cards 30 as more clearly seen in FIGS. 6 and 7. These conductor leads are interconnected by the diodes 58 and 60 and resistors 62 forming the conversion circuits.

It will be apparent from the foregoing that a telephone exchange installation equipped with the present invention may be quickly converted to called party control by plug in of the circuit cards 30 independently of the test jacks 18. Also, no external power is required because the battery 36 will supply the necessary voltage for operation.

The foregoing is considered as illustative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a plurality of connector switch assemblies at a telephone central exchange through which a signal transmitting switch train is extended between calling and receiving stations, each of said switch assemblies having operating relay means for establishing a connection to the receiving station through the switch train, signal controlled relay means for maintaining said operating relay means under control of the calling station in response to switch actuation at the receiving station, and a test jack connected to the operating relay means through the signal controlled relay means to monitor operation of the connector switch assembly, the improvement including a plug-in terminal device connected to the signal controlled relay means in parallel with and independently of the test jack at each of the connector switch assemblies, and conversion circuit means electrically connected to the signal controlled relay means by the terminal device for simulating said control of the signal controlled relay means by the calling station without interfering with monitoring of the switch assembly through the test jack.

2. The combination of claim 1 wherein said conversion circuit means includes a circuit mounting card having a plurality of conversion circuits thereon respectively corresponding to each of said switch assemblies, each of said conversion circuits including a pair of diodes interconnected in series conducting relation by a resistor.

3. The combination of claim 2 wherein said operating relay means in each of the connector switch assemblies includes normally open relay switches forming part of the switch train, and a battery operated relay coil connected to a preceding connector switch assembly by the signal controlled relay means in parallel with the conversion circuit means.

4. The combination of claim 3 wherein the signal controlled relay means includes battery reversing switches interconnected between the test jack and the operating relay and a battery operated relay coil connected to the receiving station through a following connector switch assembly.

5. The combination of claim 1 wherein said operating relay means in each of the connector switch assemblies includes normally open relay switches forming part of the switch train, and a battery operated relay coil connected to a preceding connector switch assembly by the signal controlled relay means in parallel with the conversion circuit means.

6. The combination of claim 5 wherein the signal controlled relay means includes battery reversing switches interconnected between the test jack and the operating relay and a battery operated relay coil connected to the receiving station through a following connector switch assembly.

7. The combination of claim 1 wherein the signal controlled relay means includes battery reversing switches interconnected between the test jack and the operating relay and a battery operated relay coil connected to the receiving station through a following connector switch assembly.

8. The combination of claim 7 wherein said conversion circuit means includes a circuit mounting card having a plurality of conversion circuits thereon respectively corresponding to each of said switch assemblies, each of said conversion circuits including a pair of diodes interconnected in series conducting relation by a resistor.

* * * * *